Patented Sept. 24, 1929

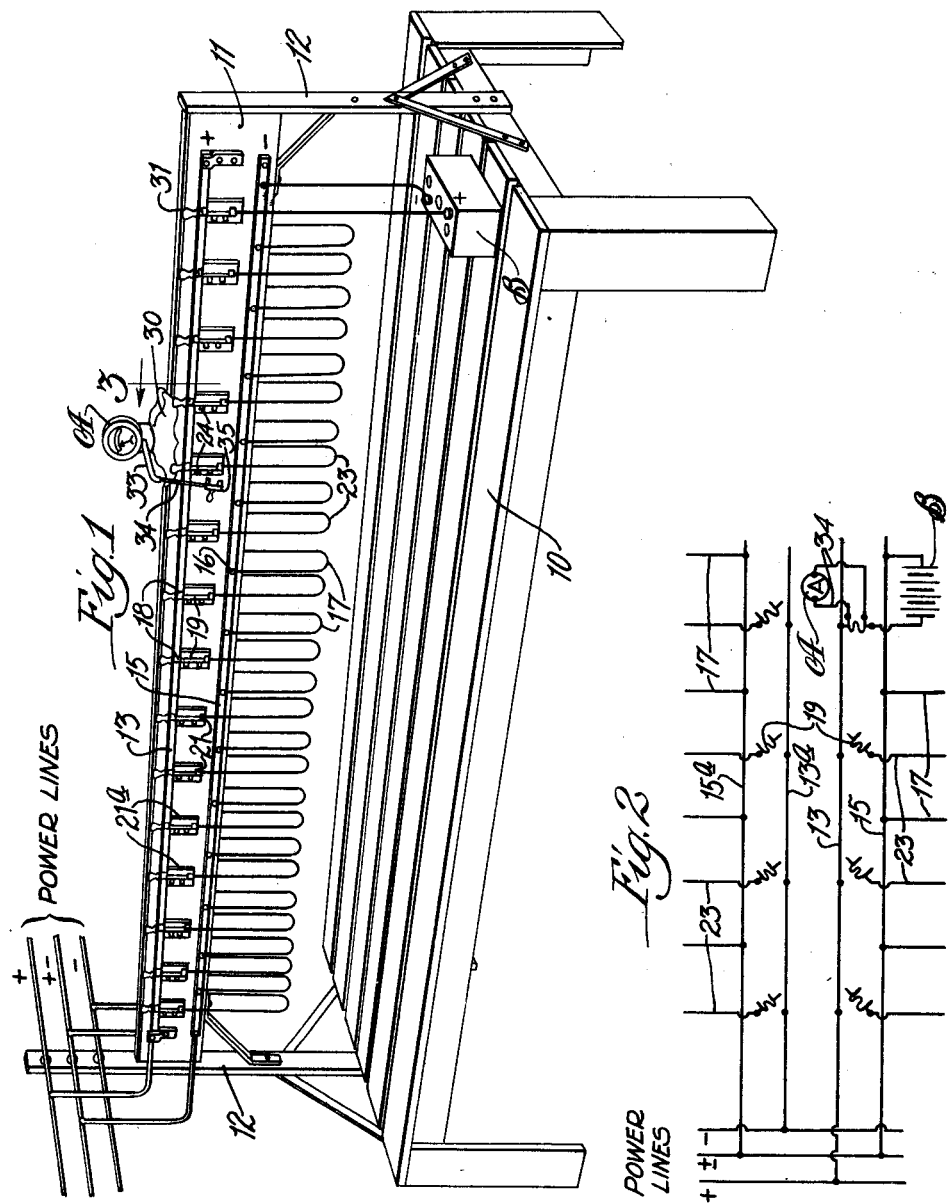

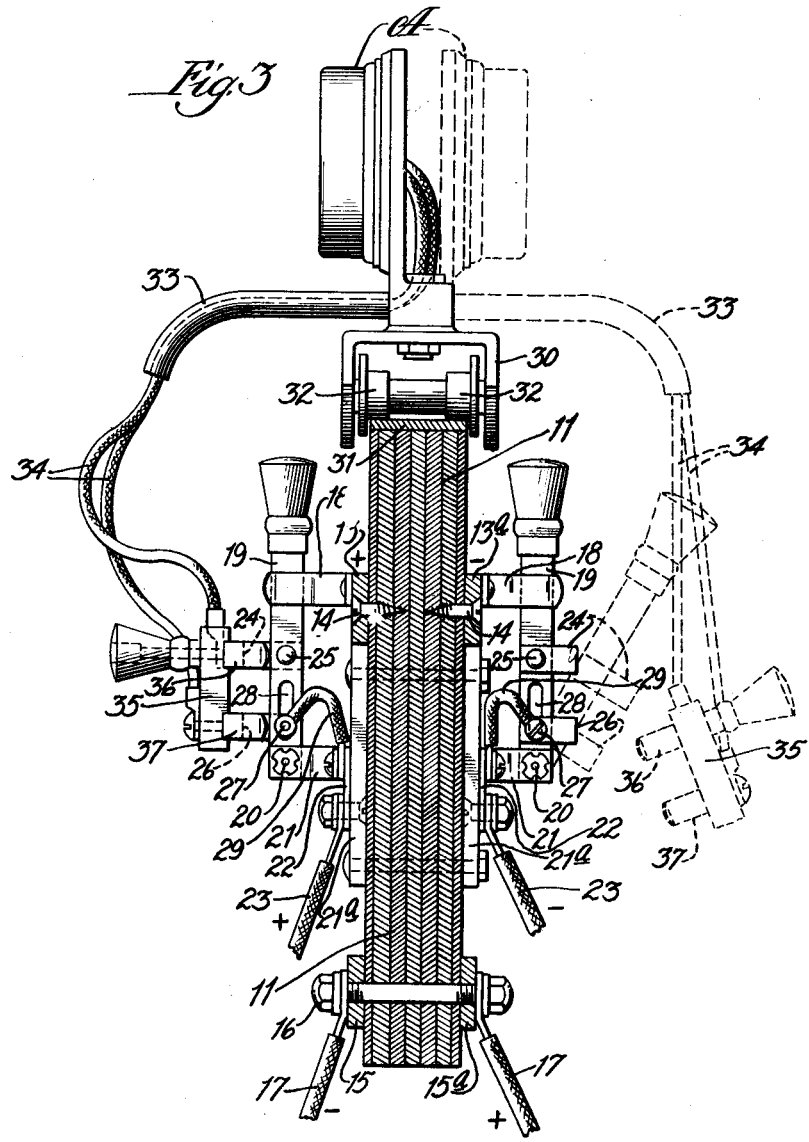

1,729,109

UNITED STATES PATENT OFFICE

BUTLER J. HASKINS, OF CHICAGO, ILLINOIS, ASSIGNOR TO JOSEPH WEIDENHOFF, INCORPORATED, A CORPORATION OF ILLINOIS

BATTERY-CHARGING BENCH

Application filed March 15, 1928. Serial No. 261,989.

This invention relates to charging benches for use in charging electric storage batteries particularly such as are used in gasoline automobiles.

An object of the invention is to provide an arrangement of leads on the bench panel which will lend itself readily to the work of charging batteries and one which at the same time is simple and economical to build.

Another object is the provision of simplified switch arrangement in charging benches and one which permits an ammeter to read the actual instant charging rate of any battery on charge and under actual charging conditions.

These and other objects as will hereinafter appear are accomplished by this invention which is fully described in the following specification and shown in the accompanying drawings, in which:

Figure 1 is a perspective view of a double charging bench embodying the invention;

Fig. 2 is a wiring diagram of the same; and

Fig. 3 is an enlarged section through the panel on the line 3 of Fig. 1.

The embodiment illustrated comprises a charging bench having a table 10 with a centrally disposed panel 11 secured above the table by means of end posts 12. This panel 11 is usually made up of boards secured together with nails or bolts. A positive bus-bar 13 is secured to the central panel 11 by means of screws 14 or the like and this extends throughout the length of the panel as shown in Fig. 1. The negative bus-bar 15 is likewise secured to the lower part of the panel 11 by means of bolts 16. These bolts also serve to hold one of the flexible cables 17.

Adjacent each bolt 16 on the bus-bar 15 is a switch contact 18 on the bus-bar 13, each contact being adapted to receive a knife switch 19 which is hingedly mounted at 20 on a switch bracket 21 which is connected through a metal bar 22 with the positive flexible cable 23. This knife switch and mounting are carried on an insulating block 21ª which is secured to the panel. Each pair of cables is sometimes called a "station" and serves for the charging of a six volt storage battery.

The knife or blade 19 is made of a suitable shunt material so that a definite length of it gives a definite resistance. On this blade is mounted a laterally projecting member 24 which is secured thereto by means of a rivet 25. A second laterally projecting member 26 is adjustably secured to the switch blade 19 by means of a screw 27 which is adjustably mounted in the slot 28 in the switch blade 19. Thus the member 26 may be adjusted to provide calibrated resistance between the members 24 and 26 since from this resistance is determined the quantity of current flowing as will later be described. The screw 27 is connected to the cable 23 through a small flexible braided connector 29.

An ammeter A is mounted upon a block 30 which is slidable back and forth on the top of the panel 11 so as to bring the ammeter in front of the knife switch of any station which it is desired to test. This is accomplished by placing a metal track 31 on top of the panel 11 and providing the block 30 with suitably journalled and flanged wheels 32 which run on this track. The ammeter A is provided with a tube 33 which extends forwardly and downwardly and through this pass two flexible cables 34 which are connected to an insulated block 35, one of the cables 34 being connected to a pair of spaced contacts 36 and the other to a pair of spaced contacts 37. These contacts are made of sheet metal and adapted to engage over the laterally projecting members 24 and 26 on the blade 19 so as to make direct electrical contact therewith.

Carefully calibrating the resistance of the blade 19 between the members 24 and 26 and knowing the potential applied to the bus-bars 13 and 15, a properly selected meter A connected to the flexible cables 34 will read the amount of current flowing through the knife switch 19 in amperes.

Where a three wire charging system is used for charging at both a seven and one-half volt and fifteen volt potentials a similar arrangement of parts is made upon the reverse side of the panel as shown in Fig. 3. In this case the intermediate or neutral wire from the generator is connected to the bus-bar 15 and this through the bolt 16 is connected to the corresponding bus-bar 15ª. The negative bus-bar 13ª then being at a potential difference of 15 volts from that of the bus-bar 13.

The meter A is mounted on the block 30 so as to swing about a vertical pivot. In this way the arm 33 is turned with the meter from the full to the dotted line position at the will of the operator so that one meter serves for all of the stations on both sides of the panel.

One great advantage of this arrangement is that once the knife switch 19 is closed the operator by inserting the meter switch 35 is able to read the actual amount of current passing through the battery. If therefore there is a better contact anywhere in the switch of any particular battery, the defect will show up immediately by a diminished charging rate. If the operator is not sure as to whether the trouble is in the switch or in the battery he can move the battery to the next charging station and repeat the test. When the meter switch 35 is not in use it hangs suspended from the arm 33, as shown in dotted line in Fig. 3. The contacts 36 and 37 of the meter switch are made parallel as are also the members 24 and 26 with which they are placed in contact so that a small longitudinal adjustment is permitted of the member 26.

When it is desired to charge a 12-volt battery it is placed across the outside bus-bars 13 and 13ª through suitable connectors 17. In Figs. 1 and 2, the battery B is shown hooked up for charging at a 6-volt rate.

The instrument A is in reality a millivolt meter which however is calibrated with the resistance between the members 24 and 26 so that it reads directly in terms of the current strength actually flowing through the switch.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In a battery charging panel, a board, two charging bus-bars insulated from each other, a series of switches each adapted to make contact with one of said bars during the operation of charging a battery, a lead from said switch to the battery to be charged, a lead from the other bar to said battery, the blade of said switch being a resistance element with contacts at separated points, an ammeter having members adapted to make electrical contact with any pair of said contacts to cause the ammeter to indicate the amount of current passing through any given switch.

2. In a battery charging panel, a board, two charging bus-bars insulated from each other, a series of switches each adapted to make contact with one of said bars during the operation of charging a battery, a lead from said switch to the battery to be charged, a lead from the other bar to said battery, the blade of said swtich being a resistance element having a pair of contacts thereon, one of said contacts being adjustable thereon to vary the resistance of that portion of the blade between contacts, an ammeter having members adapted to make electrical contact with any pair of said contacts to cause the ammeter to indicate the amount of current passing through any given switch.

3. In a battery charging panel, two bus-bars for carrying electric current, a lead from one bus-bar to a battery to be charged, a knife switch adapted to connect the other bar to a lead to a battery to be charged, the blade of said knife switch being a resistance element, a meter, and means connecting said meter in parallel with a portion of said blade to cause the meter to indicate the strength of current flowing therethrough.

In testimony whereof I have hereunto set my hand this sixth day of March, 1928.

BUTLER J. HASKINS.